US009235647B1

(12) United States Patent
Cooley et al.

(10) Patent No.: US 9,235,647 B1
(45) Date of Patent: *Jan. 12, 2016

(54) SYSTEMS AND METHODS FOR PREDICTIVE RESPONSES TO INTERNET OBJECT QUERIES

(71) Applicant: Symantec Corporation, Mountain View, CA (US)

(72) Inventors: Shaun Cooley, El Segundo, CA (US); Petrus Johannes Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,325

(22) Filed: Aug. 29, 2013

Related U.S. Application Data

(63) Continuation of application No. 12/691,188, filed on Jan. 21, 2010, now Pat. No. 8,549,018.

(51) Int. Cl.
*G06F 17/30* (2006.01)

(52) U.S. Cl.
CPC .... *G06F 17/30867* (2013.01); *G06F 17/30902* (2013.01)

(58) Field of Classification Search
USPC .......................................................... 707/754
See application file for complete search history.

(56) References Cited

U.S. PATENT DOCUMENTS

| 8,935,620 B1* | 1/2015 | Cox et al. ....................... 715/760 |
| 2002/0083132 A1 | 6/2002 | Holland et al. |
| 2003/0081859 A1* | 5/2003 | Kasutani ....................... 382/305 |
| 2005/0210383 A1* | 9/2005 | Cucerzan et al. ............. 715/533 |
| 2008/0059590 A1 | 3/2008 | Sarafijanovic et al. |
| 2008/0147808 A1 | 6/2008 | Pang |
| 2008/0222132 A1 | 9/2008 | Pan et al. |
| 2010/0057687 A1* | 3/2010 | Shen et al. ........................ 707/3 |
| 2010/0153394 A1 | 6/2010 | Wood |
| 2010/0250555 A1 | 9/2010 | Gao et al. |

OTHER PUBLICATIONS

"Cloudmark, Inc.", https://www.cloudmark.com/en, as accessed Nov. 18, 2009, (2002).

* cited by examiner

*Primary Examiner* — Amresh Singh
(74) *Attorney, Agent, or Firm* — ALG Intellectual Property, LLC

(57) ABSTRACT

A computer-implemented method for predictive responses to internet object queries may include receiving a query from a client to evaluate a first internet object. The computer-implemented method may also include analyzing the query to predict a set of additional internet objects for which the client may subsequently request an evaluation. The computer-implemented method may further include transmitting an evaluation of the first internet object and of each additional internet object in the set of additional internet objects to the client. Various other methods, systems, and computer-readable media are also disclosed.

20 Claims, 7 Drawing Sheets

SYSTEMS AND METHODS FOR PREDICTIVE RESPONSES TO INTERNET OBJECT QUERIES

CROSS REFERENCE TO RELATED APPLICATION

This application is a continuation of U.S. application Ser. No. 12/691,188, filed 21 Jan. 2010, the disclosure of which is incorporated, in its entirety.

BACKGROUND

Consumers face an ever-increasing number of annoying and harmful intrusions as they use and navigate the Internet. The number of unsolicited bulk e-mails (also known as "spam") has grown consistently over the past decade, with some researchers now estimating that more than 80% of e-mail represents spam. Besides annoying consumers, spam e-mails consume precious network bandwidth and resources and may be used as a vehicle for propagating malware or committing fraud. Malicious and inappropriate websites may pose similar threats, and they may also cause difficulties for parents who wish to oversee the content accessed by their children.

Content-filtering vendors may spare consumers from many of these problems by maintaining databases identifying spam and malicious websites. When a consumer attempts to download or access an e-mail or web document, content-filtering systems installed on a consumer's computing system may query these databases for information to determine whether to filter out an e-mail or warn the consumer about the web document.

Unfortunately, traditional content-filtering systems may also have drawbacks. Each query may consume computing resources both on the consumer side and on the vendor side. Additionally, waiting for the result of a query before loading an e-mail or web document may add unwanted latency to the consumer's experience. Accordingly, the instant disclosure identifies a need for predictive responses to internet object queries.

SUMMARY

As will be described in greater detail below, the instant disclosure generally relates to systems and methods for predictive responses to internet object queries. Embodiments of the instant disclosure may predict future internet object queries based on a current or previous query by a client and then send information on the objects of the predicted future queries to the client. For example, a method may include receiving a query from a client to evaluate a first internet object and then analyzing the query to predict a set of additional internet objects for which the client may subsequently request an evaluation. The method may also include transmitting an evaluation of the first internet object and of each additional internet object in the set of additional internet objects to the client.

The query may include a request for one or more of a variety of types of information. For example, the query may include a request for a content classification of the first internet object, a security risk assessment of the first internet object, and/or a filtering recommendation for the first internet object. Additionally, receiving the query may include receiving a variety of information. For example, information received along with and/or as part of the query may include a unique identifier corresponding to the client, the client's location, an identification of an agent used by the client to send the query, and/or a timestamp relating to the first internet object.

The first internet object may include a number of documents, such as an e-mail message and/or a uniform resource locator (i.e., a document identified by a URL). If the first internet object includes an e-mail message, the query may include a query to evaluate whether the first internet object constitutes spam. In some examples, the query may include a signature of the e-mail message.

Analyzing the query to predict the set of additional internet objects may include a number of approaches. For example, analyzing the query may include identifying a set of links from the first internet object. In this example, the set of additional internet objects may include those internet objects to which the first internet object links. In some contexts, data associated with queries from other clients may be available for analysis. In these contexts, analyzing the query may include identifying a set of queries from a plurality of clients to evaluate internet objects, performing a statistical analysis on the set of queries, and applying the query to the statistical analysis to identify the set of additional internet objects.

Performing the statistical analysis may include a variety of techniques. For example, the statistical analysis may include a frequency analysis and/or a Markov chain. In some examples, the statistical analysis may be constrained to a subset of the set of queries. For example, the statistical analysis may be performed on queries originating from the same region as the query from the client.

In some examples, a system for predictive responses to internet object queries may include a receiving module, an analysis module, and a transmission module. The receiving module may be programmed to receive a query from a client to evaluate a first internet object. The analysis module may be programmed to analyze the query to predict a set of additional internet objects for which the client may subsequently request an evaluation. The transmission module may be programmed to transmit an evaluation of the first internet object and of each additional internet object in the set of additional internet objects to the client.

The query may include a request for a variety of information. For example, the query may include a request for a content classification of the first internet object, a security risk assessment of the first internet object, and/or a filtering recommendation for the first internet object. Additionally, the receiving module may be programmed to receive a variety of information as part of receiving the query. For example, the receiving module may receive a unique identifier corresponding to the client, the client's location, an identification of an agent used by the client to send the query, and/or a timestamp relating to the first internet object.

The first internet object may include one or more of a variety of different types of documents, such as an e-mail message and/or a uniform resource locator (i.e., a document identified by a URL). If the first internet object includes an e-mail message, the query may include a query to evaluate whether the first internet object constitutes spam. In some examples, the query may include a signature of the e-mail message.

The analysis module may use a number of different approaches to analyze the query to predict the set of additional internet objects. For example, the analysis module may be programmed to analyze the query by identifying a set of links from the first internet object. In this example, the set of additional internet objects may include those internet objects linked to from the first internet object. In some contexts, data on queries from other clients may be available for analysis. In these contexts, the analysis module may be programmed to identify a set of queries from a plurality of clients to evaluate internet objects, perform a statistical analysis on the set of queries, and apply the query to the statistical analysis to identify the set of additional internet objects.

The analysis module may perform the statistical analysis using a variety of techniques. For example, the analysis module may perform a frequency analysis and/or construct a Markov chain. In some examples, the analysis module may be programmed to constrain the statistical analysis to a subset of the set of queries. For example, the analysis module may perform the statistical analysis on queries originating from the same region as the query from the client.

In some embodiments, a computer-readable-storage medium may include one or more computer-executable instructions that, when executed by at least one processor of a computing device, may cause the computing device to receive a query from a client to evaluate a first internet object and then analyze the query to predict a set of additional internet objects for which the client may subsequently request an evaluation. The instructions may also cause the computing device to transmit an evaluation of the first internet object and of each additional internet object in the set of additional internet objects to the client.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
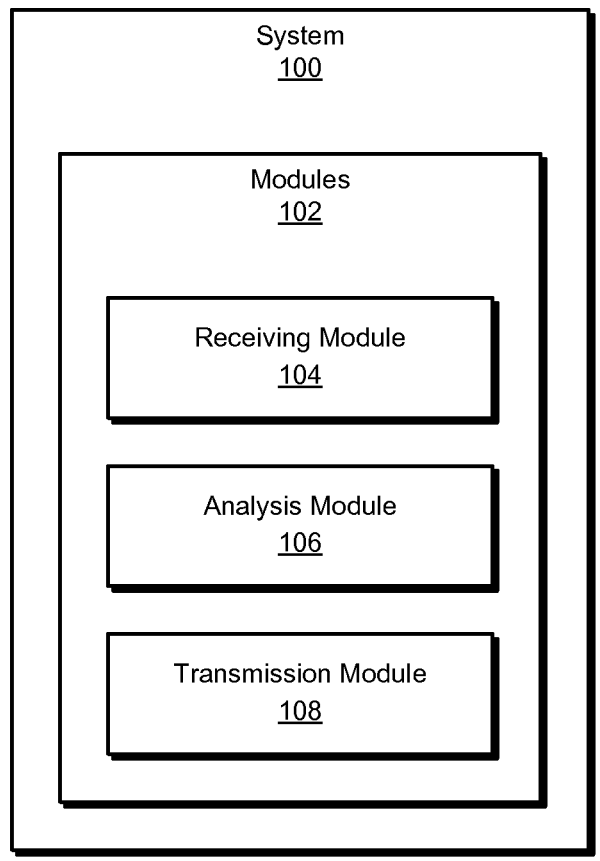
FIG. 1 is a block diagram of an exemplary system for predictive responses to internet object queries.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for predictive responses to internet object queries. Embodiments of the instant disclosure may predict future internet object queries based on a current or previous query by a client and then send information associated with the objects identified in the predicted future queries to the client. By anticipating potential future queries, embodiments of the instant disclosure may eliminate additional latency caused by waiting for query responses and may reduce the total number of queries and individual responses travelling between a client and server.

Figure 2:
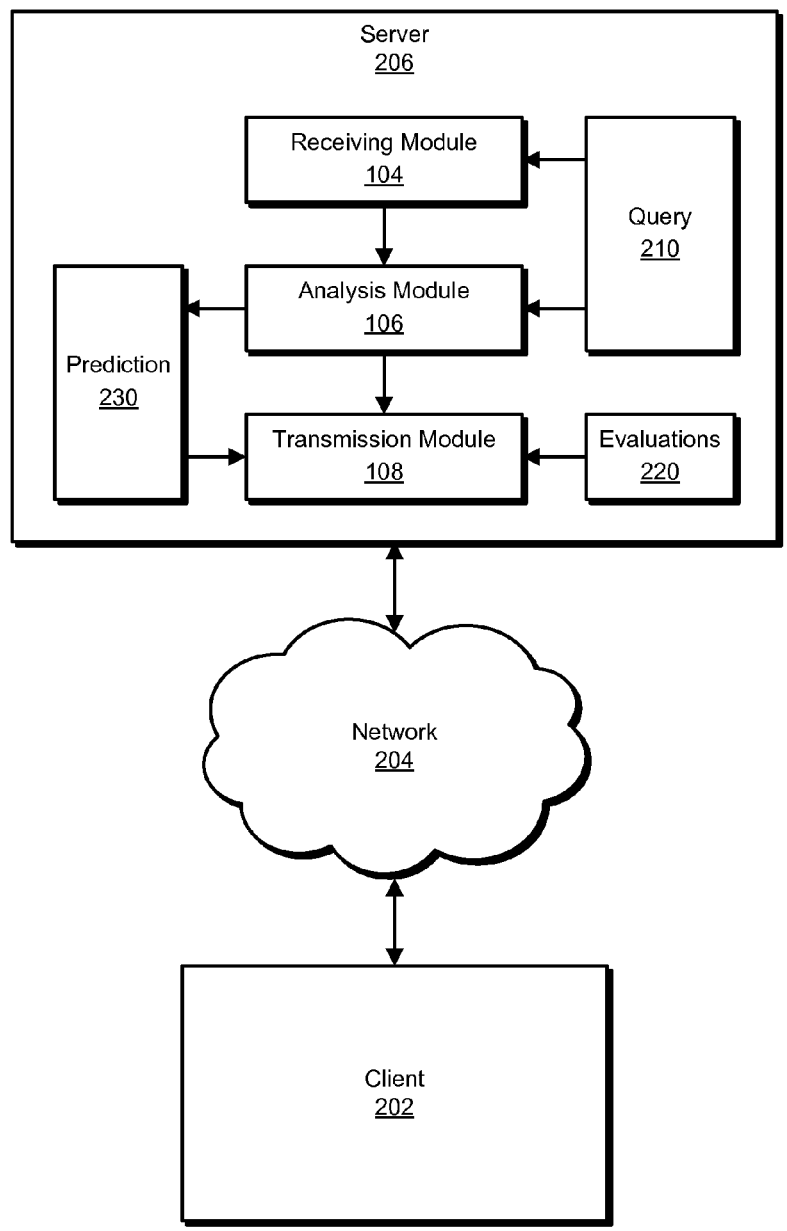
FIG. 2 is a block diagram of another exemplary system for predictive responses to internet object queries.

The following will provide, with reference to FIGS. 1-2, detailed descriptions of exemplary systems for predictive responses to internet object queries. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for predictive responses to internet object queries. As illustrated in this figure, exemplary system 100 may include one or more modules 102 for performing one or more tasks. For example, and as will be explained in greater detail below, exemplary system 100 may include a receiving module 104 programmed to receive a query from a client to evaluate a first internet object. Exemplary system 100 may also include an analysis module 106 programmed to analyze the query to predict a set of additional internet objects for which the client may subsequently request an evaluation.

In addition, and as will be described in greater detail below, exemplary system 100 may include a transmission module 108 programmed to transmit an evaluation of the first internet object and of each additional internet object in the set of additional internet objects to the client. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client 202 in communication with a server 206 via a network 204. In one embodiment, and as will be described in greater detail below, modules 102 from FIG. 1 may program server 206 to receive a query from a client to evaluate a first internet object. For example, receiving module 104 may program server 206 to receive a query 210 from client 202 to evaluate a first internet object. Modules 102 may also program server 206 to analyze the query to predict a set of additional internet objects for which the client may subsequently request an evaluation. For example, analysis module 106 may program server 206 to make a prediction 230 that includes a set of additional internet objects for which client 202 may subsequently request an evaluation. Modules 102 may also program server 206 to transmit an evaluation of the first internet object and of each internet object in the set of additional internet objects to the client. For example, transmission module 108 may program server 206 to transmit evaluations 220 to client 202.

Client 202 generally represents any type or form of computing device capable of reading computer-executable instructions. Examples of client 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of responding to queries about internet objects with evaluations of the internet objects. Examples of server 206 include, without limitation, application servers and database servers configured to provide various database services and/or run certain software applications, anti-spam request servers, and/or a URL evaluation request server.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between client 202 and server 206.

Figure 3:
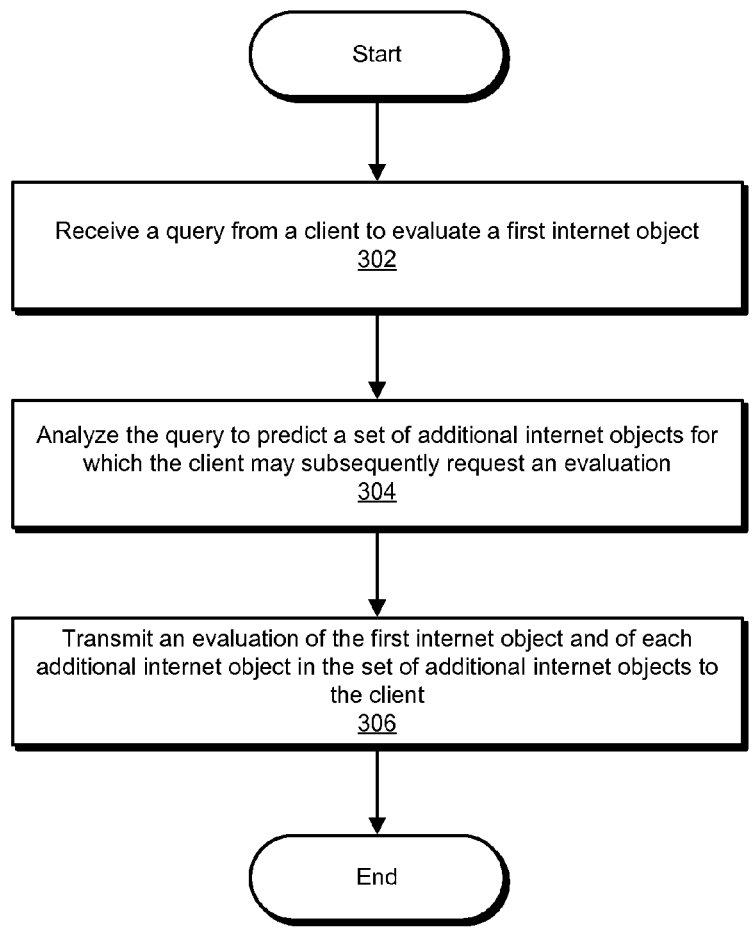
FIG. 3 is a flow diagram of an exemplary method for predictive responses to internet object queries.

FIG. 3 is a flow diagram of an exemplary computer-implemented method 300 for predictive responses to internet object queries. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may receive a query from a client to evaluate a first internet object. For example, at step 302 receiving module 104 may, as part of server 206, receive query 210 from client 202 to evaluate a first internet object.

Receiving module 104 may receive the query in a variety of contexts. For example, receiving module 104 may receive a query from a security system for a security risk assessment of the first internet object (e.g., whether the first internet object includes, refers to, and/or is associated with malware, phishing, fraud, etc.). As another example, receiving module 104 may receive a query from a content classification system attempting to classify the first internet object.

In some examples, receiving module 104 may receive a query for a filtering recommendation for the first internet object. For example, receiving module 104 may receive a query from an anti-spam system (e.g., from an e-mail client, a plug-in of an e-mail client, and/or a SMTP proxy) as to whether the first internet object is spam and should be filtered. Additionally or alternatively, receiving module 104 may receive a query from a parental control system as to whether the first internet object is inappropriate and should be filtered.

A used herein, the phrase "internet object" may refer to any digital object, document, and/or message that may be subject to evaluation, classification, rating, and/or filtering. For example, an internet object (such as the first internet object) may include an e-mail message, a URL (e.g., an HTML page, a media file, and/or any other file and/or document to which a URL may refer), and/or any other suitable data object.

Receiving module 104 may receive the query in a variety of forms. For example, if the first internet object includes an e-mail message, receiving module 104 may receive a query to evaluate whether the first internet object constitutes spam. In this example, the query may include a signature of the e-mail message. For example, the query may include a hash of the e-mail message (e.g., a cryptographic hash such as MD5, SHA1, etc.). In some examples, the query may include a hash taken of the e-mail message after a normalization step, enabling use of the hash to identify similar and/or equivalent e-mail messages. Additionally or alternatively, the query may include a fuzzy hash of the e-mail message (e.g., a NILSIMSA code based on the e-mail message). As another example, if the first internet object includes a URL, receiving module 104 may receive a query to evaluate whether the URL is malicious and/or inappropriate. In this example, the query may include the URL and/or a domain of the URL.

In addition to information identifying the first internet object, receiving module 104 may also receive a variety of other types of information related to the query, the client, and/or the first internet object. For example, receiving module 104 may receive a unique identifier corresponding to the client. The unique identifier may include a number and/or a string that uniquely identifies the client to receiving module 104. Additionally or alternatively, the unique identifier may include a string that likely uniquely identifies the client (such as an IP address, which may correspond to multiple clients, or a hash, which may uniquely identify the client except in the case of a hash collision).

Receiving module 104 may also receive a location of the client. For example, receiving module 104 may receive (e.g., as part of the query and/or as part of metadata to the transmission of the query) an IP address of the client. Additionally or alternatively, receiving module 104 may receive and/or generate a region code of the client (e.g., a code and/or data string indicating a geographical region). The region indicated by the region code may correspond to political regions, census regions, media demographic regions, or any other scheme of regional division useful for predicting which internet objects a client may attempt to access.

Receiving module 104 may also receive information related to the query such as an identification of an agent used by the client to send the query (e.g., an identification of an e-mail client, a web browser, a plug-in, etc.), and/or a timestamp relating to the first internet object (e.g., if the first internet object includes an e-mail message, the time that the e-mail message was received by the client). As will be described in greater detail below, some or all of this information may be recorded in a database for later analysis.

At step 304 one or more of the systems described herein may analyze the query to predict a set of additional internet objects for which the client may subsequently request an evaluation. For example, at step 304 analysis module 106 may, as part of server 206, analyze query 210 to make a prediction 230 of the set of additional internet objects for which client 202 may subsequently request an evaluation.

Analysis module 106 may perform step 304 in a variety of ways. For example, in some contexts, a plurality of clients may send queries to evaluate internet objects (and receiving module 104 may receive the queries). Analysis module 106 may accordingly identify a set of additional queries (e.g., those queries from the plurality of clients) to evaluate internet objects. For example, analysis module 106 may access a database (such as an anti-spam signature database or a URL evaluation database) that tracks queries to spam signatures and/or URLs. As mentioned earlier, receiving module 104 may store information relating to a query, a client that sent the query, and/or an internet object that occasioned the query.

After identifying the set of queries, analysis module 106 may perform a statistical analysis on the set of queries. The statistical analysis may include any suitable prediction model. In one example, the statistical analysis may include a frequency analysis. By way of example, FIG. 4 illustrates an exemplary system 400 for predictive responses to internet queries that employs a frequency analysis.

Figure 4:
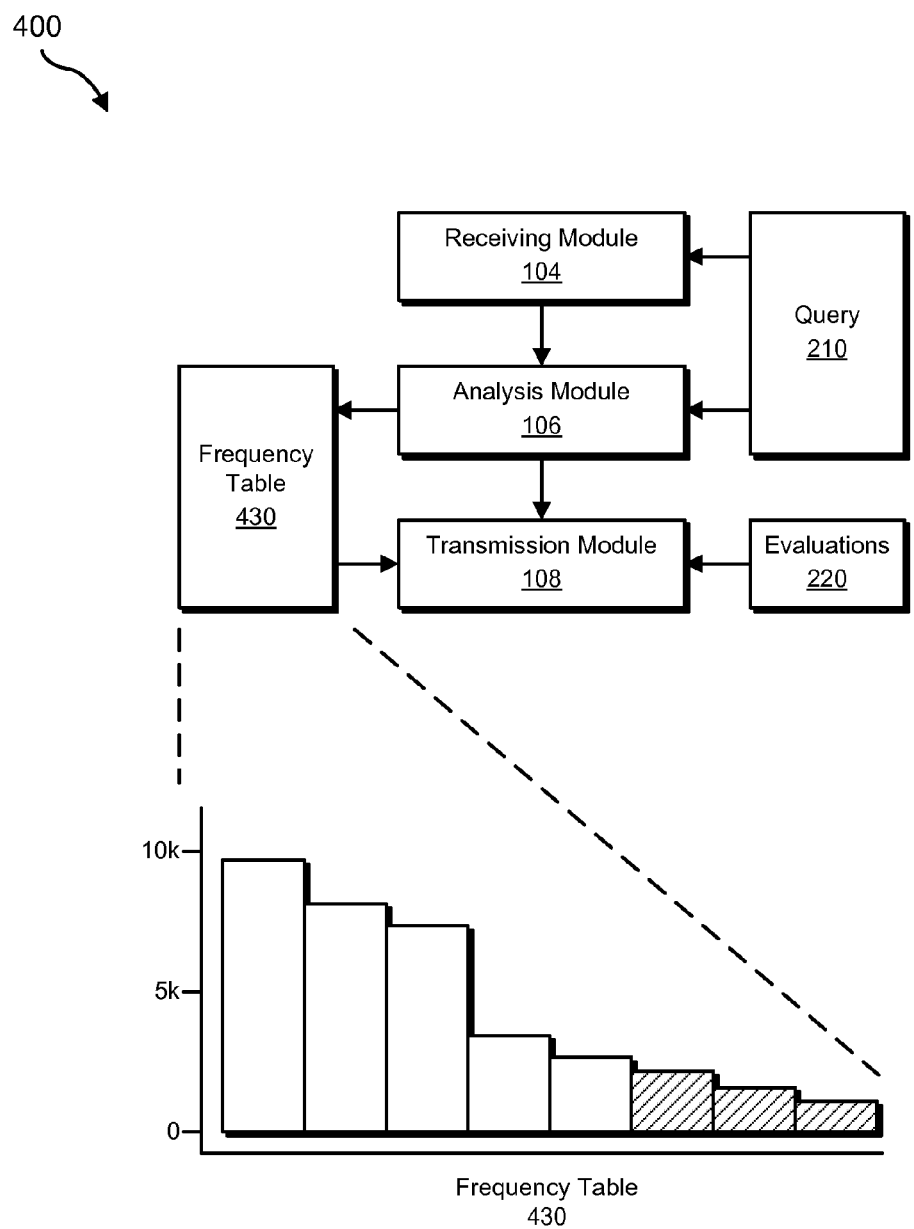
FIG. 4 is a block diagram of an exemplary system for predictive responses to internet object queries.

As illustrated in FIG. 4, analysis module 106 may generate a frequency table 430 (shown as a histogram) of internet objects most queried subsequent to a query of the first internet object. In some embodiments, analysis module 106 may predict the set of additional internet objects as the top hits on the frequency table. For example, frequency table 430 may show the five most frequently queried internet objects subsequent to a query of the first internet object. In some examples, analysis module 106 may constrain the frequency table by time (e.g., the most frequently queried internet objects within ten minutes of a query to the first internet object). Additionally or alternatively, analysis module 106 may constrain the frequency table by the geo-location of the client (e.g., the most frequently queried internet objects by clients in Manhattan subsequent to a query of the first internet object). Generally, analysis module 106 may constrain the frequency table in any suitable manner (e.g., to improve the predictive power of the analysis and/or to conserve resources).

In some examples, the statistical analysis may include constructing a Markov chain. In these examples, analysis module 106 may perform a complex query on a database containing the set of queries using stored procedures and temporary tables to perform the calculations. Additionally or alternatively, analysis module 106 may use an appropriate algorithm built into a database as part of the query (e.g., analysis module 106 may use the MICROSOFT SEQUENCE CLUSTERING ALGORITHM built into MICROSOFT SQL SERVER 2005). In these examples, analysis module 106 may also constrain the analysis by time (e.g., including only queries from a given client within ten minutes of that client's query to the first internet object), location (e.g., including only queries from clients in the same region as the client), and/or any other suitable constraint.

Analysis module 106 may apply the query to the statistical analysis to identify the set of additional internet objects. In some embodiments, the query itself may have shaped the statistical analysis. In these embodiments, analysis module 106 may apply the query to the statistical analysis simply by performing the statistical analysis in the context of the query.

Figure 5:
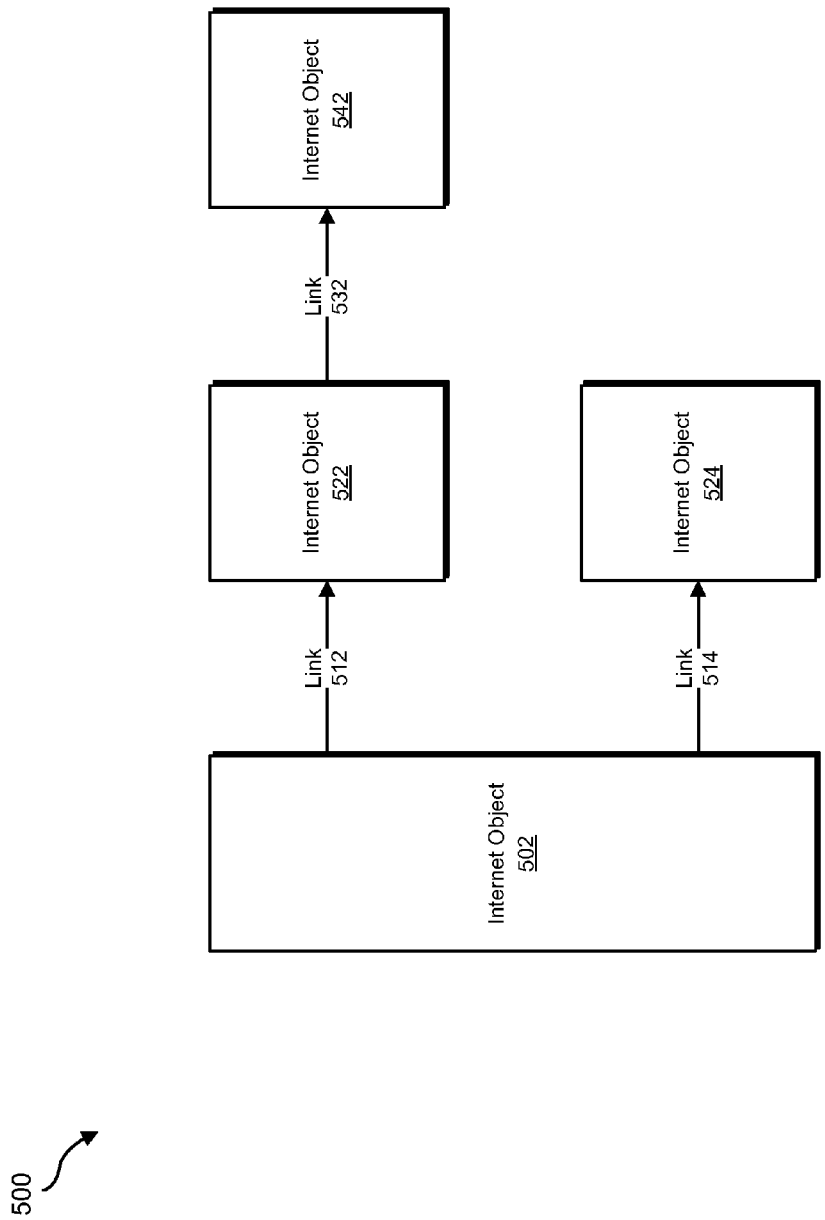
FIG. 5 is a block diagram of an exemplary link structure of a set of internet objects.

In addition to or instead of performing a statistical analysis, analysis module 106 may predict the set of additional internet objects by identifying a set of links from the first internet object to the set of additional internet objects. By way of example, FIG. 5 illustrates an internet object link structure 500. As illustrated in FIG. 5, link structure 500 may include an internet object 502 with a link 512 to an internet object 522 and a link 514 to an internet object 524. Internet object 522 may include a link 532 to an internet object 542. If receiving module 104 receives a query for internet object 502, analysis module 106 may look up internet object 502 and discover links 512 and 514 to internet objects 522 and 524. Analysis module 106 may therefore include internet objects 522 and 524 in the prediction.

In some examples, analysis module 106 may perform a deep search for linked internet objects (e.g., two, three, or more levels deep). For example, analysis module 106 may search the first internet object for links pointing to a first level of internet objects and include the internet objects in the first level of internet objects in the prediction. Analysis module 106 may then search each internet object in the first level of internet objects for links pointing to a second level of internet objects and add the internet objects in the second level of internet objects to the prediction. Using the internet object link structure 500 as an example, analysis module 106 may predict an upcoming query for internet object 542 because internet object 542 is only two links distant from internet object 502 (e.g., starting from internet object 502, analysis module 106 could reach internet object 542 by following two links in succession: links 512 and 532).

Analysis module 106 may rely solely on the link-based analysis described above to generate predictions. Additionally or alternatively, analysis module 106 may supplement and/or integrate the statistical analysis discussed earlier with this link-based analysis.

As another example of the operation of analysis module 106, receiving module 104 may receive a query for the domain "sports.yahoo.com". Analysis module 106 may, through statistical analysis and/or a link-based analysis, determine that likely subsequent queries include the domains "www.mlb.com", "www.nfl.com", and "www.nba.com" (e.g., because users tend to visit these domains shortly after visiting "sports.yahoo.com" and/or because "sports.yahoo.com" includes several links to these domains). Analysis module 106 may also perform a second-order analysis on "sports.yahoo.com" by analyzing each of "www.mlb.com", "www.nfl.com", and "www.nba.com". If the query for "sports.yahoo.com" came from Southern California, analysis module 106 may restrict the analysis by region, yielding the additional predictions of "www.dodgers.com", "www.chargers.com", and "www.lakers.com".

Returning to FIG. 3, at step 306 one or more of the systems described herein may transmit an evaluation of the first internet object and of each additional internet object in the set of additional internet objects to the client. For example, at step 306 transmission module 108 may, as part of server 206, transmit evaluations 220 corresponding to prediction 230 to client 202.

Transmission module 108 may perform step 306 in any suitable manner. In some examples, transmission module 108 may transmit the evaluation of the first internet object immediately (e.g., without waiting for the analysis of the query) and transmit evaluations of the additional internet objects in the set of additional internet objects as soon thereafter as possible. In this way, transmission module 108 may minimize latency for the original query. In other embodiments, transmission module 108 may transmit the evaluation of the first internet object and the evaluations of the set of additional internet objects as a group. In this way, transmission module 108 may minimize the number of transmissions.

Various embodiments and examples of predictive responses to internet object queries are disclosed in a U.S. Application titled "Systems and Methods for Identifying Spam Mailing Lists" and filed 2 Feb. 2010, the disclosure of which is incorporated, in its entirety, by this reference. By identifying spam mailing lists, embodiments of the instant disclosure may be able to better target clients with predictive responses to internet object queries (e.g., spam-related queries). For example, analysis module 106 may analyze a query from a client about a spam e-mail message to predict a set of additional spam e-mail messages for which the client may subsequently request an evaluation by determining that the client is on a spam mailing list and that the set of additional spam e-mail messages are bound for the client because the client is on the spam mailing list.

Figure 6:
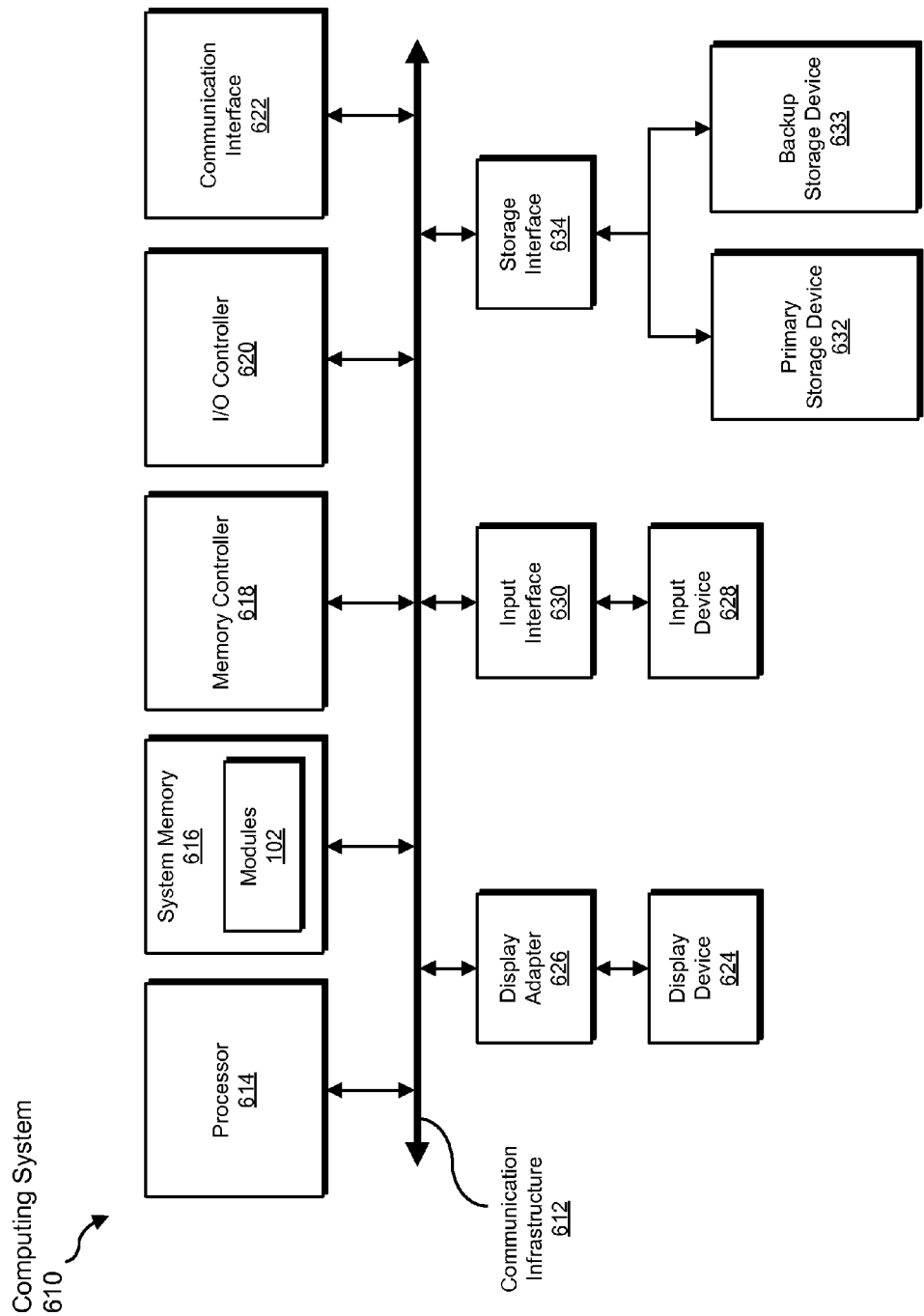
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the receiving, analyzing, identifying, performing, constructing, applying, and/or transmitting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as receiving, analyzing, identifying, performing, constructing, applying, and/or transmitting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the receiving, analyzing, identifying, performing, constructing, applying, and/or transmitting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the receiving, analyzing, identifying, performing, constructing, applying, and/or transmitting steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the receiving, analyzing, identifying, performing, constructing, applying, and/or transmitting steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the receiving, analyzing, identifying, performing, constructing, applying, and/or transmitting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
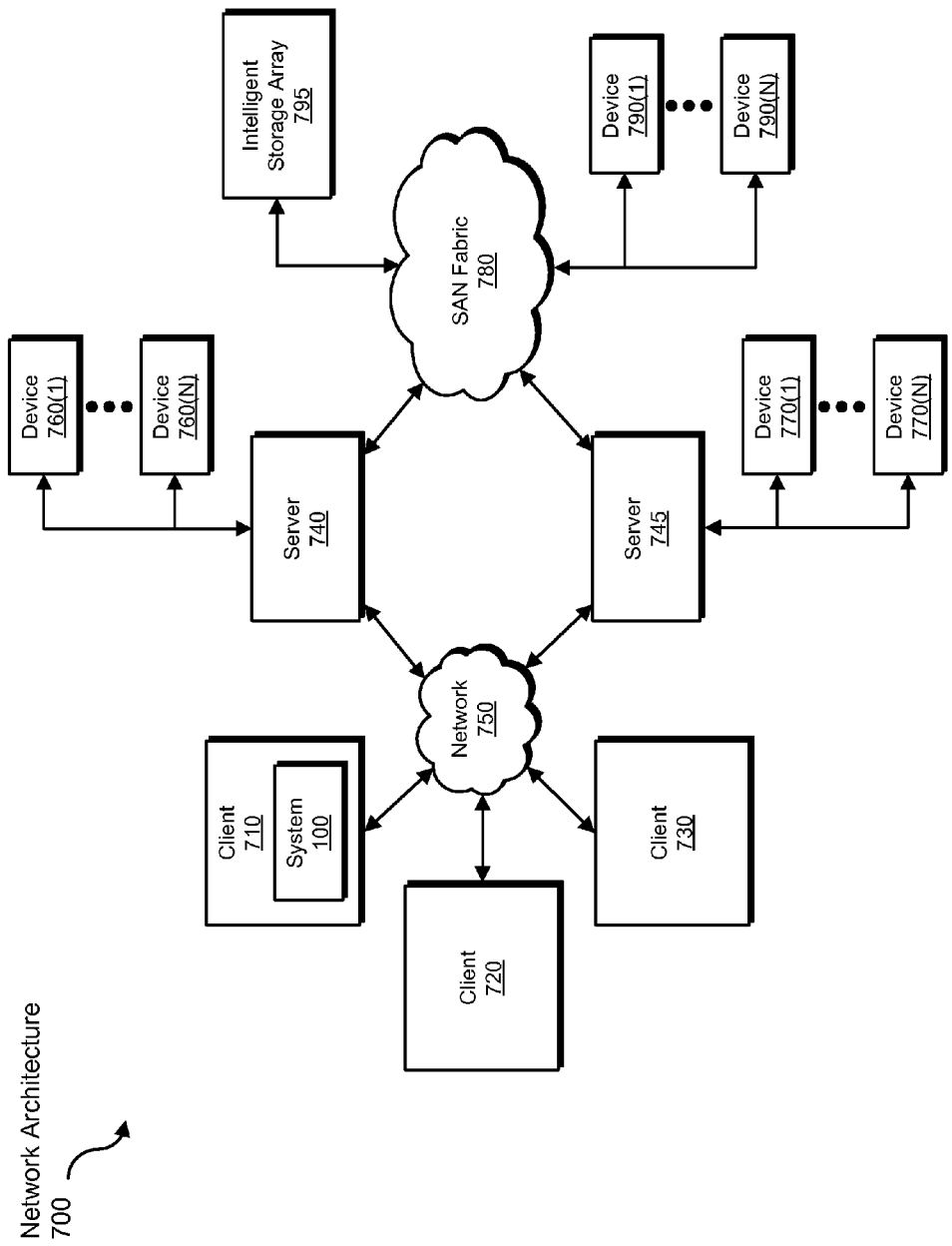
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the receiving, analyzing, identifying, performing, constructing, applying, and/or transmitting steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for predictive responses to internet object queries.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an internet object evaluation server into an efficient, latency-minimizing evaluation server. As another example, one or more of the modules described herein may transform an internet object query into a prediction of likely future internet object queries.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for predictive responses to internet object queries, at least a portion of the method being performed by a computing device comprising at least one processor, the method comprising:
   receiving a query from a client to evaluate whether a first internet object constitutes spam, the first internet object comprising an e-mail message;
   analyzing the query to predict a set of additional internet objects for which the client may subsequently request an evaluation at least in part by:
      identifying a set of previous queries from a plurality of clients to evaluate internet objects;
      performing a statistical analysis on the set of previous queries from the plurality of clients, the statistical analysis comprising a frequency analysis that indicates frequencies of internet objects queried subsequent to an earlier query for the first internet object;
      applying the received query to the statistical analysis on the set of previous queries from the plurality of clients to predict the set of additional internet objects for which the client may subsequently request an evaluation;
   transmitting an evaluation of the first internet object and a separate evaluation of each additional internet object in the predicted set of additional internet objects to the client.

2. The computer-implemented method of claim 1, wherein receiving the query from the client to evaluate the first internet object comprises receiving a query from the client for at least one of:
   a content classification of the first internet object;
   a security risk assessment of the first internet object;
   a filtering recommendation for the first internet object.

3. The computer-implemented method of claim 1, wherein the query is received from an anti-spam system.

4. The computer-implemented method of claim 1, further comprising receiving an identification of an agent used by the client to send the query.

5. The computer-implemented method of claim 1, wherein receiving the query to evaluate the first internet object comprises receiving a signature of the e-mail message.

6. The computer-implemented method of claim 5, wherein the signature comprises a hash.

7. The computer-implemented method of claim 1, wherein receiving the query from the client to evaluate the first internet object comprises receiving at least one of:
   a unique identifier corresponding to the client;
   a timestamp relating to the first internet object.

8. The computer-implemented method of claim 1, further comprising receiving a location of the client.

9. The computer-implemented method of claim 1, wherein performing the statistical analysis on the set of previous queries comprises constructing a Markov chain.

10. The computer-implemented method of claim 1, wherein the set of additional internet objects corresponds to a set of internet objects that, according to the frequency analysis, were queried most frequently subsequent to a query of the first internet object.

11. The computer-implemented method of claim 1, wherein the frequency analysis generates a histogram.

12. A system for predictive responses to internet object queries, the system comprising:
   a receiving module programmed to receive a query from a client to evaluate whether a first internet object constitutes spam, the first internet object comprising an e-mail message;
   an analysis module programmed to analyze the query to predict a set of additional internet objects for which the client may subsequently request an evaluation at least in part by:
      identifying a set of previous queries from a plurality of clients to evaluate internet objects;
      performing a statistical analysis on the set of previous queries from the plurality of clients, the statistical analysis comprising a frequency analysis that indicates frequencies of internet objects queried subsequent to an earlier query for the first internet object;
      applying the received query to the statistical analysis on the set of previous queries from the plurality of clients to predict the set of additional internet objects for which the client may subsequently request an evaluation;
   a transmission module programmed to transmit an evaluation of the first internet object and a separate evaluation of each additional internet object in the predicted set of additional internet objects to the client;
   at least one processor configured to execute the receiving module, the analysis module, and the transmission module.

13. The system of claim 12, wherein the receiving module is programmed to receive the query from the client to evaluate the first internet object by receiving a query from the client for at least one of:
   a content classification of the first internet object;
   a security risk assessment of the first internet object;
   a filtering recommendation for the first internet object.

14. The system of claim 12, wherein the receiving module is programmed to receive the query from an anti-spam system.

15. The system of claim 12, wherein the receiving module is programmed to receive a location of the client.

16. The system of claim 12, wherein the receiving module is programmed to receive the query to evaluate the first internet object by receiving a signature of the e-mail message.

17. The system of claim 16, wherein the signature comprises a hash.

18. The system of claim 12, wherein the receiving module is programmed to receive the query from the client to evaluate the first internet object by receiving at least one of:
   a unique identifier corresponding to the client;
   a timestamp relating to the first internet object.

19. The system of claim 12, wherein the receiving module is programmed to receive an identification of an agent used by the client to send the query.

20. A non-transitory computer-readable-storage medium comprising one or more computer-executable instructions that, when executed by at least one processor of a computing device, cause the computing device to:
   receive a query from a client to evaluate whether a first internet object constitutes spam, the first internet object comprising an e-mail message;
   analyze the query to predict a set of additional internet objects for which the client may subsequently request an evaluation at least in part by:
      identifying a set of previous queries from a plurality of clients to evaluate internet objects;
      performing a statistical analysis on the set of previous queries from the plurality of clients, the statistical analysis comprising a frequency analysis that indicates frequencies of internet objects queried subsequent to an earlier query for the first internet object;
      applying the received query to the statistical analysis on the set of previous queries from the plurality of clients to predict the set of additional internet objects for which the client may subsequently request an evaluation;
   transmit an evaluation of the first internet object and a separate evaluation of each additional internet object in the predicted set of additional internet objects to the client.

* * * * *